July 11, 1944.  V. V. HAUGH  2,353,334
CONSTANT LOAD TRANSMISSION
Filed April 27, 1942
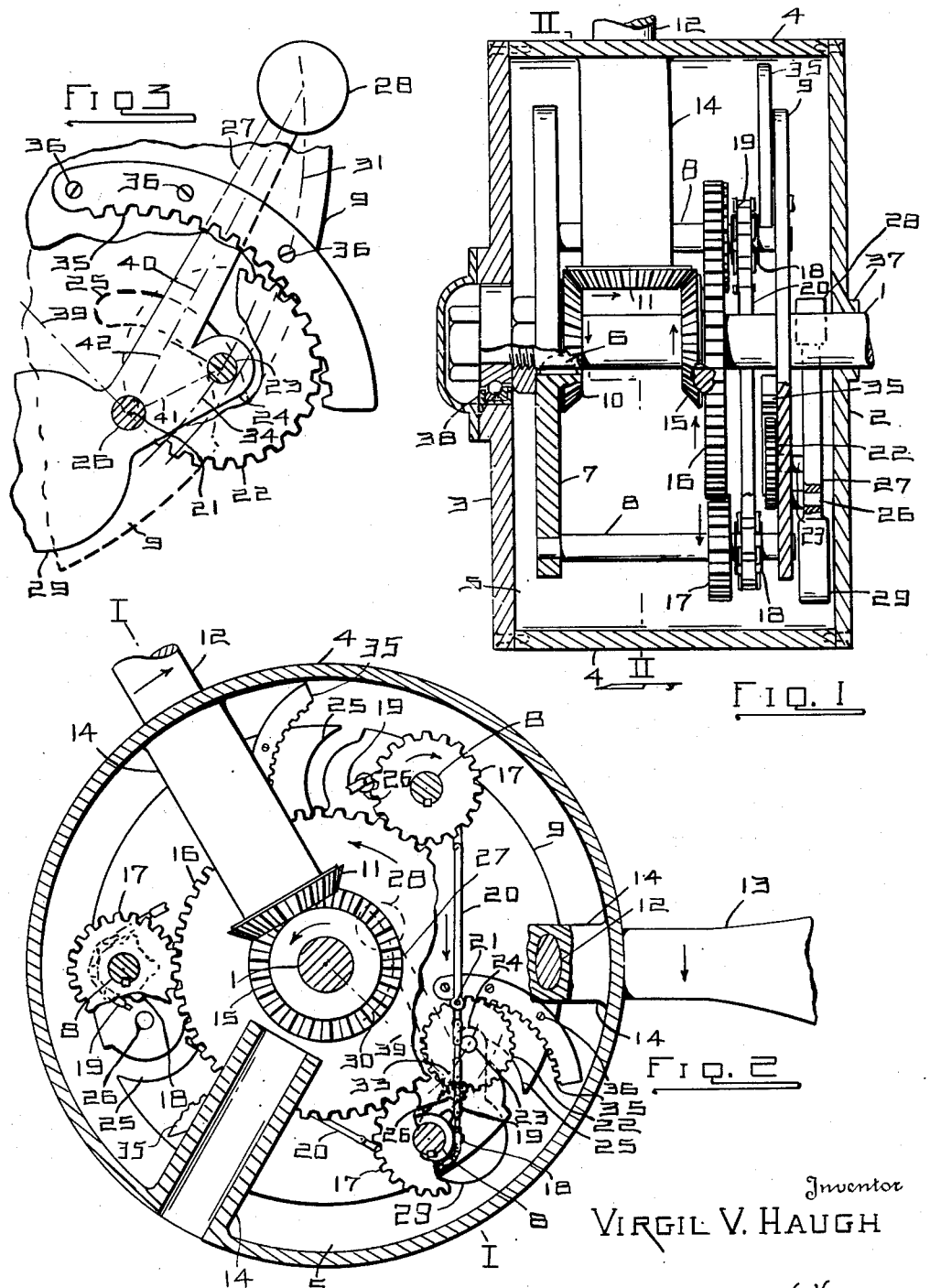
Inventor
VIRGIL V. HAUGH
By
Attorney Patented July 11, 1944

2,353,334

UNITED STATES PATENT OFFICE 2,353,334

CONSTANT LOAD TRANSMISSION

Virgil V. Haugh, Tiffin, Ohio

Application April 27, 1942, Serial No. 440,616

5 Claims. (Cl. 170—162)

This invention relates to speed varying control for load maintenance.

This invention has utility when incorporated in efficient power consumption from a given energy source through speed variation.

Referring to the drawing:

Fig. 1 is a medial section through the unit device of this control transmission;

Fig. 2 is a section approximating the line II—II, Fig. 1, to show the control features; Fig. 1 being on the line I—I, Fig. 2; and Fig. 3 is a detail view on an enlarged scale of the speed control at a remote position from the showing in Fig. 2.

A constant load supply power shaft 1 which may be from an internal combustion motor extends into housing comprising disks 2, 3, and intermediate shell 4, thereby providing chamber 5. In this chamber 5 on the shaft 1 key 6 mounts disk 7 having in this instance three minor shafts 8 parallel to the shaft 1 and extending from the disk 7 keyed to the shaft 1 into disk 9 parallel to the disk 7. Fixed with the disk 7 is beveled gear 10 in mesh with beveled gear 11 fixed with shaft 12 having anchored therewith propeller 13. This shaft 12 in the chamber 5 has rectangular housing 14 providing a sleeve bearing for such portion of the shaft 12 in the housing shell 4, thereby locating this shaft 12 for the propeller in radial position. The assembly herein at 120° apart for the propellers 13, approximates a balanced or uniform distribution for the load by the carrier or housing 4.

The beveled gear 11 is held in mesh with the gear 10 for effecting rotation of this housing shell 4 with the propellers 13 by opposing beveled gear 15 loose on the shaft 1 and having fixed therewith gear 16 in mesh with pinions 17 keyed on the respective minor shafts 8. Also fixed on these minor shafts 8 are sprockets 18 in mesh with sprocket chain sections 19 connected by links 20 in an endless flexible belt. Each sprocket chain section has a pin 21 connection to gear 22, herein shown (Fig. 2) in a position near the teeth of the gear 22. Each gear 22 is freely rotatable on bearing pintle 23 in flyweight arm 24 (Fig. 3). The gear 22 is spaced from the arm 24 for this pin 23 to ride in guide arc slot 25 in the disk 9. The pin 23 swings on bearing 26 mounted also in the disk 9. The flyweight mass, besides carrying the gear 22 by means of the pin 23, has a major arm 27 carrying control flyweight 28. Additionally, there is a neutralizing flyweight 29 on a short arm of this control mass opposite the arm 24.

The swinging of this flyweight 28 is on its pivot bearing 26 as the disk 9 rotates. At slow speed, or starting, the path of the weight 28 is at an inner arc 30, (Fig. 2). As the speed increases, the path approaches an outer arc 31 (Fig. 3). In this transit the bearing pin 23 on the short arm 24 of the flyweight control mass has its flyweight radius shift from arm 33 (Fig. 2) to arc 34 (Fig. 3) in thereby approaching the arc 31. In this transit or outward swinging away of from the shaft 1 of the weight 28, the teeth of the gear 22 are in mesh with rack teeth 35 anchored by screws 36 with the link 9. The curved slot 25 is a guide for the axis pin 23 of the gear 22. The arc of swinging of the pin 23 is from the center pin 26 held in the disk 9. The outward transit of the weight 28 moves the pin 21, connecting the gear 22 and the endless belt 19, 20, in an approximately straight travel line and thereby transmits such lineal shifting to the endless belt to be effective on the sprocket wheels 18, the shafts 8, and the pinions 17 through the gear 16 and beveled gear 15, thereby to provide a turning angle for the shaft 12 against a fixed angular relation determined by the gear 10. This means that the pitch of the blade 13 is thereby automatically adjusted to the end that the power supplied by the prime mover to the shaft 1 at an approximately constant speed is effective for efficient conversion into an approximately uniform load in the reaction effected on the propeller blades or other place for power consumption. This efficiency is of value in motor transit operations.

The set-up for this unit is with the disk 2 having bearing 37 on the shaft 1 (Fig. 1). Additionally, the housing disk 3 has a bearing 38. The pin 26 in the disk 9 has radius 39 (Fig. 2). The arm 27 mounted on pin 26 may be considered to have a radius line 40 (Fig. 3) to the weight 28 and radius line 41 to the pin 23. Accordingly, the transmitted action of the weight 28 has a projected arm extent 42 on the line 40.

The operation

With the shaft 1 a source of power operating clockwise (Fig. 1) or counter-clockwise (Fig. 2), transmission action is to the disk 7 and the beveled gear 10, thereby tending to rotate the beveled gear 11. This beveled gear 11 is held by the beveled gear 15 loose on the shaft 1 and fixed with the gear 16. The holding is effected because this gear 16 in mesh with the pinion 17 on the shaft 8 is connected by the sprocket wheel 18 and the sprocket chain link device 19, 20, to the gears 22 by way of the pins 21, the gears 22 being connected by pivot bearings 23 in arms 24 from bearings 26 in the disk 9. This arm 24 has fixed therewith the arm 27 carrying the flyweight 28. Accordingly, in this direction of operation, the flyweight 28 is held into snug position against the shaft 1. This means there is rotation of the beveled pinions 10 and 15 with the shaft 1 and accordingly a holding of the beveled pinion 11 against rotation on its own axis but for such to revolve with this shell or housing 4 to impart rotation to such shell in carrying therewith the propeller blades 13.

A feature in the design hereunder is that the radius 39 from the pin 26 for the flyweight is of the length of the arm to the flyweight 28. Under this consideration a swing of this flyweight 28, were such from a coincident position in the axis of the shaft 10 to an angle of 45° therefrom, then the sine and cosine would be equal. The companion arm for this flyweight device, were such 90° from the arm axis line 40, in theory might be taken to carry out the hypotenuse distance from this isosceles triangle. The experience hereunder has prompted consideration of an axis line 41 for this arm 24, say at about 37° from the axis line 40 for the flyweight 28. Accordingly, in the outward swing of the flyweight 28 it is effective for its perpendicular distance from the axis of the pin 23. Therefore this load or moving force from this flyweight 28 acts on the gear 22. While the neutralizing weight 29 as to the arm 24 and the gear 22 as to the mass thereo is stabilized to their axis point 26, practical simplification has prompted adoption of working range features. The working flyweight 28 contacting the shaft 1 forms a stop and thus does not go down to have its arm 40 coincide with the radius line 39.

Upon pick up in the speed of the driven propellers 13, the flyweights 28 take on momentum. In so doing, this outward swing of the flyweights 28 on the arms 27 is effective through the gears 22 and the sprocket chain 19, 20, to rotate the several sprocket wheels 18 and thereby through the pinions 17 meshing with the gears 16 provides additional opposing gearing to that of the transmission connection 10, causing the beveled gear 15 to so act on the beveled gears 11 that the respective propellers 13 have their pitch increased, thereby to build up resistance to rotation. There is, accordingly, in this set-up a positive direct response independent of the inter-position of springs, and this response is for constant load on the shaft 1 and automatically varied speed in the driven members or propellers 13. It is thus seen that from the minimum work in position for the flyweight 28, describing the arc 30 (Fig. 2), such has a transit outward past the arc 33 of its transmission from the minimum radius portion and even past the arc described by the radius 39 to the bearing 26 for this flyweight mass. In this outward transit there is a gradual building up of the momentum or power available in this flyweight 28. This may be so determined as to the pitch of the propellers or applied load that the constant speed drive shaft 1 may have such speed maintained with efficient consumption of the power through the flyweight control hereunder. In the straight line travel of the pin 21 on rotation of the gear 22, this is in line or approximately in line with the bearing 26. In this relationship the line of action of this pin to the bearing 23 approximates equal effective angle with the active mesh relation of this gear 22 with the segment 35.

What is claimed and it is desired to secure by Letters Patent is:

1. A drive shaft, a driven member, direct transmission connection therebetween, and an additional relatively shiftable speed controlled connection opposing the transmission connection and including a flyweight pivotally mounted eccentric of the drive shaft, a gear swingable with the flyweight, there being a bearing for the gear spaced from the pivotal mounting for the flyweight, and meshing means from the gear connecting the drive shaft to the driven member to oppose the transmission connection.

2. A speed control flyweight device embodying a terminally weighted arm, a bearing for the device, an additional transmission arm including a gear eccentric of the bearing, meshing means for acting upon the gear upon swinging of the arm for rotating the gear relatively to the arms.

3. A speed control flyweight device embodying a terminally weighted arm, a pivot bearing for the device, an additional transmission arm including a gear eccentric of the bearing, meshing means for acting upon the gear at swinging of the arm for rotating the gear relatively to its arm, a driven member, and an actuating connection between tne driven member and the gear.

4. A drive shaft, a driven member, a direct transmission connection therebetween, and an additional relatively shiftable speed controlled connection in parallel with the transmission connection and including a flyweight, a bearing eccentrically of the drive shaft pivotally mounting the flyweight, and additional relatively yieldable connection from the flyweight to the driven member to modify the transmission connection relation between the shaft and driven member.

5. A drive shaft, an annular series of driven propeller blades, direct gearing transmission connection between the shaft and one side of the propeller blades, a carrier free on the shaft and spacing the propeller blades rotatably mounted in said carrier for varying their pitch, and additional interconnecting gearing between the drive shaft and the other side of the propeller blades, including fly weight means, and connecting means between the fly weight means and the additional gearing to change the angular position of the gearing to angularly shift the propeller blades in the carrier to vary the pitch of said propeller blades.

VIRGIL V. HAUGH.